(12) United States Patent
Yuan et al.

(10) Patent No.: US 10,176,508 B2
(45) Date of Patent: Jan. 8, 2019

(54) SYSTEM, METHOD, AND NON-TRANSITORY COMPUTER-READABLE STORAGE MEDIA FOR EVALUATING SEARCH RESULTS FOR ONLINE GROCERY PERSONALIZATION

(71) Applicant: Wal-Mart Stores, Inc., Bentonville, AR (US)

(72) Inventors: Mindi Yuan, Burlingame, CA (US);
Ioannis Pavlidis, Boulder, CO (US);
Mukesh Jain, Burlingame, CA (US);
Kristy Ann Caster, Des Moines, WA (US)

(73) Assignee: WALMART APOLLO, LLC, Bentoville, AR (US)

( * ) Notice: Subject to any disclaimer, the term of this patent is extended or adjusted under 35 U.S.C. 154(b) by 371 days.

(21) Appl. No.: 14/986,147

(22) Filed: Dec. 31, 2015

(65) Prior Publication Data
US 2017/0193586 A1    Jul. 6, 2017

(51) Int. Cl.
*G06Q 30/06* (2012.01)
*G06Q 30/02* (2012.01)

(52) U.S. Cl.
CPC ..... *G06Q 30/0631* (2013.01); *G06Q 30/0625* (2013.01); *G06Q 30/0633* (2013.01); *G06Q 30/0643* (2013.01); *G06Q 30/0251* (2013.01); *G06Q 30/0255* (2013.01)

(58) Field of Classification Search
None
See application file for complete search history.

(56) References Cited

U.S. PATENT DOCUMENTS

| | | | | |
|---|---|---|---|---|
| 6,317,722 B1* | 11/2001 | Jacobi | ............... | G06Q 30/02 705/14.51 |
| 6,912,505 B2* | 6/2005 | Linden | ............... | G06Q 30/02 705/14.53 |
| 7,720,720 B1* | 5/2010 | Sharma | ............... | G06Q 30/0631 705/26.7 |
| 7,792,706 B2* | 9/2010 | Tirumalareddy | ...... | G06Q 30/02 705/26.7 |
| 8,326,701 B2* | 12/2012 | Westphal | ............... | G06Q 30/02 705/26.7 |
| 8,438,052 B1* | 5/2013 | Chanda | ............... | G06Q 30/0282 705/7.11 |
| 8,645,221 B1* | 2/2014 | Sarma | ............... | G06Q 30/0601 705/26.1 |
| 9,892,438 B1* | 2/2018 | Kundu | ............... | H05K 999/99 |
| 2002/0019763 A1* | 2/2002 | Linden | ............... | G06Q 30/02 705/14.53 |

(Continued)

OTHER PUBLICATIONS

Ko, P., et al., "Improved Personalized Reccomendation Technique for E-Commerce Portal An," Journal of KISS: Computing Practices, 14.9, pp. 835-840, Korean Information Science Society, Publication date: 2008.*

*Primary Examiner* — Nicholas D Rosen
(74) *Attorney, Agent, or Firm* — Bryan Cave Leighton Paisner LLP

(57) ABSTRACT

A system, method and computer product for allowing a processing device to generate search engine results using a cobought model algorithm, filter the search results based on product information and past transaction data, and provide personalized recommendations for online grocery shoppers.

24 Claims, 16 Drawing Sheets

(56) References Cited

U.S. PATENT DOCUMENTS

| | | | |
|---|---|---|---|
| 2006/0036510 A1* | 2/2006 | Westphal | G06Q 30/02 705/26.62 |
| 2009/0043665 A1* | 2/2009 | Tirumalareddy | G06Q 30/02 705/26.8 |
| 2010/0030578 A1* | 2/2010 | Siddique | G06Q 10/0637 705/3 |
| 2010/0299204 A1* | 11/2010 | Westphal | G06Q 30/02 705/14.49 |
| 2014/0172652 A1* | 6/2014 | Pobbathi | G06Q 10/087 705/28 |
| 2014/0279208 A1* | 9/2014 | Nickitas | G06Q 30/0631 705/26.7 |
| 2015/0081470 A1* | 3/2015 | Westphal | G06Q 50/01 705/26.7 |
| 2017/0193582 A1 | 7/2017 | Guo et al. | |
| 2017/0193587 A1 | 7/2017 | Caster et al. | |

* cited by examiner

SYSTEM, METHOD, AND NON-TRANSITORY COMPUTER-READABLE STORAGE MEDIA FOR EVALUATING SEARCH RESULTS FOR ONLINE GROCERY PERSONALIZATION

FIELD OF THE DISCLOSURE

The present invention relates to search engines, and more particularly, to systems, methods, and computer-readable storage media that allow a processing device to generate search engine results and provide personalization for online grocery shoppers. The suggested class/subclass of the disclosure is: CLASS 707/732 (DATA PROCESSING: DATABASE, DATA MINING, AND FILE MANAGEMENT OR DATA STRUCTURES/Post processing of search results) and the suggested Art Unit is 2161.

COPYRIGHT NOTICE

A portion of this disclosure contains material that is subject to copyright protection. The copyright owner has no objection to the facsimile reproduction by anyone of this patent document as it appears in the U.S. Patent and Trademark Office, patent file or records, but reserves all copyrights whatsoever in the subject matter presented herein.

BACKGROUND

Search engines are used throughout the World Wide Web and Internet, including, but not limited to social networks, general Internet searches, e.g., Google, Yahoo, Bing, etc. . . . , and retail commercial websites. Search engines are also used to manage human resources databases, inventory database, and the like. Such systems typically include the search engine logic, the database, front end logic, and any business or other logic that may be used to present or organize the search engine results.

The data in the database and the logic comprising such systems are almost always constantly improved or updated. Various personalized eCommerce recommender systems, for example, have been developed during the past two decades. However, it is hard to directly apply these recommender systems in the grocery domain. Most of the eCommerce websites focus on durable goods or standardized products, while grocery retailers sell consumables. Moreover, online grocery applications and recommender systems must be personalized because each individual shopper has her own food preferences. Current eCommerce recommender systems are often centered around similar items, whereas grocery systems must be devoted to customers and their preferences. Grocery systems must not only find the type of products consumers like (e.g., bananas, avocados, deli meat), but also must pick the right specific item (green vs. yellow bananas, hard vs. ripe avocados, thick vs. thin sliced deli meat, etc.) for delivery.

Online grocery systems face challenges that are rarely encountered in traditional eCommerce systems. In traditional eCommerce, delivery time can be flexible, from a few days to several weeks. Traditional eCommerce orders do not have the same urgency as grocery orders because they typically contain durable goods, as opposed to consumable (and often perishable) goods in grocery orders. As such, value is the main benefit associated with traditional eCommerce systems. Customers trade off longer wait times for lower prices. The delivery time window for grocery orders, by comparison, is typically two hours. In many cases, people cannot afford to wait longer for their grocery orders. A late order may mean that the customer runs out of food. The main benefit associated with online grocery systems is convenience, since customers can typically get the same products in stores for similar prices. To meet the demands of online grocery customers, a service provider must have an efficient transportation system and a precise demand forecasting and inventory replenishment system.

Unlike in traditional eCommerce systems, the inventory stock status of a grocery product is harder to predict. For instance, an item could be available when a customer places an order, but the same item is out of stock when the order is being fulfilled for delivery. These situations seldom happen in non-grocery eCommerce, where items can be held upon the order placement. Grocery items, on the other hand, typically cannot be held mainly due to freshness concerns.

As a result, it is not uncommon that an item needs to be substituted in a grocery order. Determining how to select substitutions for each customer presents unique challenges. A bad substitution can negate the benefit (i.e., convenience) of online grocery shopping, as the customer may have to go to the store to purchase the original item if the chosen substitution does not fit her needs. A common approach is to compute a similar-item list for each item. If an item is out of stock, the most similar item candidates in its similar-item list are suggested for substitution. The similarity between two items can be determined as a weighted combination of multiple features: the item's name, category, brand, size, and so on. For each customer, those weights can be tuned differently. For example, a customer for whom brand is more important than size would have brand weighted more heavily so that she is more likely to receive a substitute item from the same brand but in a different size. Meanwhile, another customer might receive a same-size package but from a different brand if the size is more important to her.

In addition, online grocery shopping using recipe websites presents distinct challenges. It is difficult for consumers to efficiently locate the correct grocery items that correspond to ingredients listed in recipes. With current solutions, a customer may go to retailer's website after visiting a recipe website to find each ingredient separately and create a shopping list. Alternatively, a customer may print the recipe and shop for each ingredient in a brick-and-mortar grocery store. Both solutions require users to manually map an ingredient to a product in a grocery store, which is time-consuming, frustrating, and prone to error.

The present invention is aimed at one or more of the problems identified above.

SUMMARY OF THE INVENTION

In different embodiments of the present invention, systems, methods, and computer-readable storage media allow a processing device to generate search engine results using a cobought model algorithm, filter the search results based on product information and past transaction data, and provide personalized recommendations for online grocery shoppers.

In one aspect of the present invention, a system including a product database stored on a server, an interface of a customer device and a processing device of the server comprised of an order unit, a search engine unit, and a recommender unit is provided. The interface includes an online shopping cart, to which the customer can add products she wishes to purchase. The order unit identifies the products and retrieves information from a product database about the products, groups the products into departments, and detects a shopping task associated with the customer based on the grouping. The order unit then transmits a search request to locate cobought products to a search engine unit. A cobought product is a product that is associated with at least one past purchase including one of the products. The search engine unit initiates a search of the product database and receives a list of search results including cobought products. A relevance score is generated for each of the cobought products. The search engine unit transmits the list of search results sorted by relevance score to a recommender unit, which evaluates the search results and eliminates one or more results based on a predefined relevance score threshold. The recommender unit then maps each of the products and each of the remaining cobought products into one or more subcategories, and generates cobought subcategories for each of the products. The recommender unit then identifies at least one recommended product based on the search results and presents the recommended product to the customer on the customer device.

In another embodiment of the present invention, a method is provided. An order unit identifies a plurality of products for purchase that a customer has placed in an electronic shopping cart of a retailer on a customer electronic device. The order unit groups each of the plurality of products for purchase into one or more departments. The order unit detects at least one shopping task associated with the customer based on the department grouping. The order unit sends to a search engine unit a search request to locate cobought products in a product database stored on a product server. The product database may contain historical data regarding past purchases of all products offered for sale by the retailer. A cobought product is a product being associated with at least one past purchase including one of the plurality of products for purchase by the customer. The search engine unit generates a list of search results including a plurality of cobought products. The search engine unit assigns a relevance score to each of the plurality of cobought products. The search engine unit transmits the list of search results sorted by relevance score to a recommender unit. The recommender unit evaluates the list of search results and eliminates one or more results based on a predefined relevance score threshold. The recommender unit maps each of the plurality of products for purchase and each of the remaining cobought products from the list of search results into one or more subcategories. The recommender unit generates one or more cobought subcategories for each of the plurality of products for purchase. The recommender unit identifies at least one recommended product based on the search results. The recommender unit presents the at least one recommended product to the customer on the customer electronic device.

In still another embodiment of the present invention, one or more non-transitory computer-readable storage media, having computer-executable instructions embodied thereon, wherein when executed by at least one processor, the computer-executable instructions cause the processor to operate as an order unit, a search engine unit, and a recommender unit. A product database is stored on a server. An interface of a customer device is in communication with a processing device of the server. The interface an online shopping cart, to which the customer can add products she wishes to purchase. The processing device of the server includes the order unit, the search engine unit, and the recommender unit. The order unit identifies the products and retrieves information from a product database about the products, groups the products into departments, and detects a shopping task associated with the customer based on the grouping. The order unit then transmits a search request to locate cobought products to a search engine unit. A cobought product is a product that is associated with at least one past purchase including one of the products. The search engine unit initiates a search of the product database and receives a list of search results including cobought products. A relevance score is generated for each of the cobought products. The search engine unit transmits the list of search results sorted by relevance score to a recommender unit, which evaluates the search results and eliminates one or more results based on a predefined relevance score threshold. The recommender unit then maps each of the products and each of the remaining cobought products into one or more subcategories, and generates cobought subcategories for each of the products. The recommender unit then identifies at least one recommended product based on the search results and presents the recommended product to the customer on the customer device.

BRIEF DESCRIPTION OF THE FIGURES

Non-limiting and non-exhaustive embodiments of the present invention are described with reference to the following figures. Other advantages of the present disclosure will be readily appreciated, as the same becomes better understood by reference to the following detailed description when considered in connection with the accompanying drawings wherein.

Figure 1:
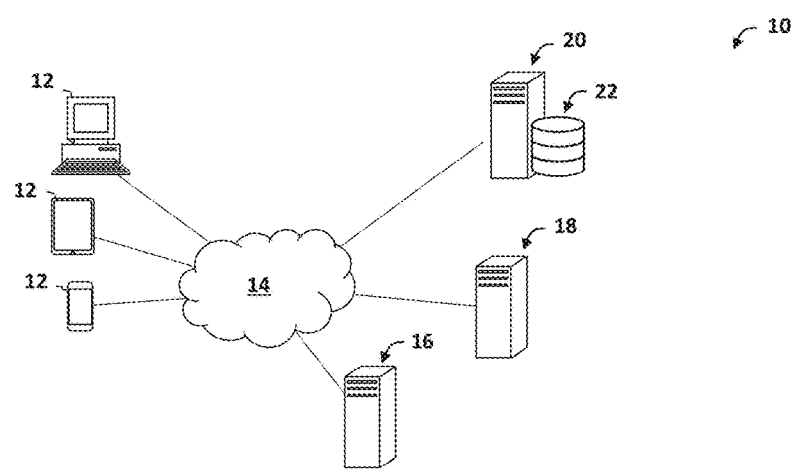
FIG. 1 is a schematic illustrating various aspects of a system, according to the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

With reference to the FIGS. and in operation, the present invention provides a system 10, methods and computer product media that generate results of a search of a database. In general use, the search engine allows a processing device of a retailer to perform a search after a user (e.g., a customer of the retailer) indicates a product for online purchase via a website or an application, i.e., "app", running on a user device. Referring to FIG. 1, an exemplary environment in which the system 10 operates is illustrated. In the illustrated embodiment, the system 10 is configured to enable a user or customer to access a website with one or more user computing devices 12 to view information indicative of products that may be purchased by the user.

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media. An apparatus may be expressed in terms of modules and/or units that include one or more discrete hardware components or portions thereof as configured by software (in any form). Furthermore, an apparatus may take the form of one or more elements expressed as a means for performing a specified function. When expressed in such a form, the means are to be interpreted as meaning the combination of hardware components or portions thereof contained within this specification, and any equivalents thereof.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis. The term "coupled" means any suitable communications link, including but not limited to the Internet, a LAN, a cellular network, or any suitable communications link. The communications link may include one or more of a wired and wireless connection and may be always connected, connected on a periodic basis, and/or connected on an as needed basis.

For clarity in discussing the various functions of the system 10, multiple computers and/or servers are discussed as performing different functions. These different computers (or servers) may, however, be implemented in multiple different ways such as modules within a single computer, as nodes of a computer system, etc. . . . The functions performed by the system 10 (or nodes or modules) may be centralized or distributed in any suitable manner across the system 10 and its components, regardless of the location of specific hardware. Furthermore, specific components of the system 10 may be referenced using functional terminology in their names. The function terminology is used solely for purposes of naming convention and to distinguish one element from another in the following discussion. Unless otherwise specified, the name of an element conveys no specific functionality to the element or component.

In the illustrated embodiment, the system 10 includes a hosting server 16, a search engine server 18, a database server 20, a database 22, and one or more user computing (or customer) devices 12 that are each coupled in communication via a communications network 14. The communications network 14 may be any suitable connection, including the Internet, file transfer protocol (FTP), an Intranet, LAN, a virtual private network (VPN), cellular networks, etc. . . . , and may utilize any suitable or combination of technologies including, but not limited to wired and wireless connections, always on connections, connections made periodically, and connections made as needed.

The user computing device 12 may include any suitable device that enables a user to access and communicate with the system 10 including sending and/or receiving information to and from the system 10 and displaying information received from the system 10 to a user. For example, in one embodiment, the user computing device 12 may include, but is not limited to, a desktop computer, a laptop or notebook computer, a tablet computer, smartphone/tablet computer hybrid, a personal data assistant, a handheld mobile device including a cellular telephone, and the like. The user computing device 12 may be used to by a user, such as a customer, to purchase items online from a retailer.

The database server 20 includes a memory device that is connected to the database 22 to retrieve and store information contained in the database 22. The database 22 contains information on a variety of matters, such as, for example, customer account/profile information, product data, purchase history data, and/or any suitable information that enables the system 10 to function as described herein. In one embodiment, the database 22 may include a recipe bank that includes a plurality of recipes and that may be used to help determine a customer's shopping task.

Recommendations Based on Cobought Model

The hosting server 16 may be configured to host a website or provide data to the app that is accessible by a user via one or more user computing devices 12. For example, the hosting server 16 may retrieve and store web page 24 (shown in FIGS. 4A-4B) associated with one or more websites in response to requests received by the user via the user computing device 12 to allow users to interact with the website and search and/or purchase products such as, for example, goods and/or services via the website. In one embodiment, the hosting server 16 is configured to generate and display web page 24 associated with the website in response to requests being received from consumers via corresponding web browsers that are displayed on the user computing devices 12. For example, in one embodiment, the hosting server 16 may display an online shopping cart 26 (shown in FIG. 4A) in response to receiving a user request that allows a user to input a product that the customer wishes to purchase. In addition, the hosting server 16 may transmit information about the product input to the search engine server 18 for use in generating search data in response to the system's search request. The hosting server 16 may also receive a recommended product list 28 (shown in FIG. 4B) from the search engine server 18 that includes information associated with products that are selected based on the search criteria. The hosting server 16 may also display a recommendation webpage 30 to display the recommended product list 28 containing one or more recommended products 32 to the user and to allow the user to select one or more of the recommended products 32 for purchase.

In the illustrated embodiment, the search engine server 18 is configured to receive a product search request from the hosting server 16 including one or more search terms, and generate search data including a plurality of products as a function of the search terms. For example, in one embodiment, the search engine server 18 may initiate a cobought model algorithm (discussed in more detail below) to search product data contained in the database 22.

Figure 2:
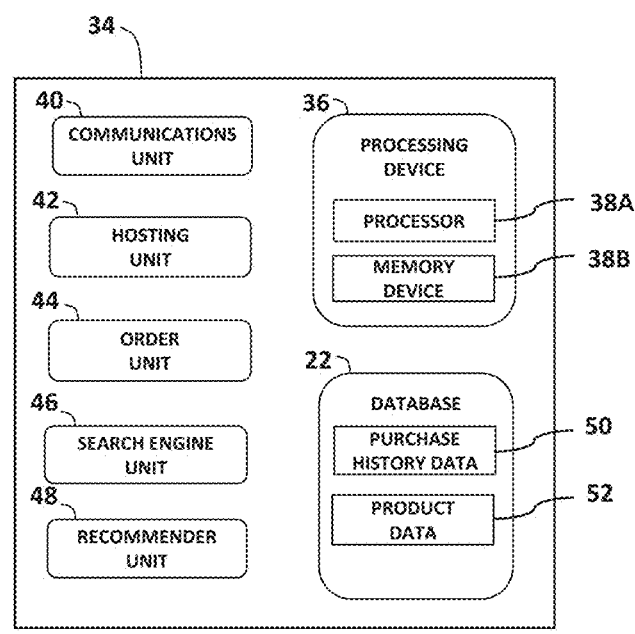
FIG. 2 is a schematic illustrating example components of a server, according to a first embodiment of the present invention.

Referring to FIG. 2, in one embodiment, the system 10 may include a system server 34 that is configured to perform the functions of the hosting server 16, the search engine server 18, and/or the database server 20. In the illustrated embodiment, the system server 34 includes a processing device 36 and the database 22.

The processing device 36 executes various programs, and thereby controls components of the system server 34 according to user instructions received from the user computing device 12. The processing device 36 may include a processor or processors 38A and a memory device 38B, e.g., read only memory (ROM) and random access memory (RAM), storing processor-executable instructions and one or more processors that execute the processor-executable instructions. In embodiments where the processing device 36 includes two or more processors 38A, the processors 38A can operate in a parallel or distributed manner. In an example, the processing device 36 may execute and/or implement a communications unit 40, a hosting unit 42, a search engine unit 44, an order unit 46, and a recommender unit 48.

The memory device 38B may be configured to store programs and information in the database 22, and retrieve information from the database 22 that is used by the processor to perform various functions described herein. The memory device 38B may include, but is not limited to, a hard disc drive, an optical disc drive, and/or a flash memory drive. Further, the memory device may be distributed and located at multiple locations.

In one embodiment of the present invention, the memory device 38B may include one or more of the memory devices and/or mass storage devices of one or more of the computing devices or servers. The modules that comprise the invention are composed of a combination of hardware and software, i.e., the hardware as modified by the applicable software applications. In one embodiment, the units of the present invention are comprised of one of more of the components of one or more of the computing devices or servers, as modified by one or more software applications.

The communications unit 40 retrieves various data and information from the database 22 and sends information to the user computing device 12 via the communications network 14 to enable the user to access and interact with the system 10. In one embodiment, the communications unit 40 displays various images on a graphical interface of the user computing device 12 preferably by using computer graphics and image data stored in the database 22 including, but not limited to, web pages, recommended product lists, and/or any suitable information and/or images that enable the system 10 to function as described herein.

The hosting unit 42 may be programmed to perform some or all of the functions of the hosting server 16 including hosting various web pages associated with one or more websites that are stored in the database 22 and that are accessible to the user via the user computing device 12. The hosting unit 42 may be programmed to generate and display web pages associated with a website in response to requests being received from users via corresponding web browsers.

The database 22 is configured to store product data associated with a plurality of products. The product data may include department/subcategory information, information about shopping tasks associated with product(s), recipes, and purchase history data. In general, the department information identifies in which general department a product is typically found (e.g., milk is typically found in the dairy department, carrots are generally found in the produce department, etc.). In general, the information about shopping tasks identify different types of tasks a customer might be performing based upon the contents of a shopping cart. For instance, a box of pasta and a can of marinara sauce might indicate that the customer is preparing a spaghetti dinner. Recipe data might also be useful in determining the customer's shopping task. For example, if a customer is purchasing 3 out of 4 ingredients in a common recipe, the system may recognize that the customer is attempting to make the meal indicated in the recipe. The purchase history data generally provides information related to the number of times a product has been purchased together with another product (globally, by all customers). It may also include the personalized purchase history of a particular customer. For instance, the system may recognize very recent purchases by the same customer and may use such data as appropriate, such as in its shopping task analysis.

In one embodiment of the present invention, the order unit 44 may identify a plurality of products for purchase that a customer has placed in an electronic shopping cart via user computing device 12. The memory device 38B may retrieve information from the database 22 about the plurality of products. The order unit 44 may then group each of the plurality of products into one or more departments and detect at least one shopping task associated with the customer based on the department grouping. The order unit 44 may then send to the search engine unit 46 a search request to locate at least one cobought product. A cobought product is a product that is associated with at least one past purchase including one of the plurality of products. The past purchases may include all purchases by all customers of the retailer.

The search engine unit 46 may be programmed to perform some or all of the functions of the search engine server 18 including generating and storing purchase history data 50 and product data 52. The search engine unit 46 is coupled to the memory device 38B and the order unit 44. The search engine unit 46 is configured to receive the search request from the order unit 44. The search engine unit 46 may initiate a cobought model algorithm to search purchase history data 50 and product data 52 and receive, from the memory device 38B, search results data associated with the search request. The (initial) search results data includes the plurality of cobought products. In addition, the search engine unit 46 may also be programmed to generate a relevance score associated with each of the cobought products. The search engine unit 46 may transmit the list of search results sorted by relevance score to the recommender unit 48.

The recommender unit 48 is coupled to the processing device 38A and the memory device 38B and is configured to receive the search results. The recommender unit 48 evaluates the search results and may eliminate one or more of the results based on a product's relevance score. A minimum relevance score may be set as a threshold for inclusion in a list of filtered search results.

In order to narrow the search results further, the recommender unit 48 may send a search request to search engine unit 44. The search engine unit 46 may initiate a cobought subcategory model algorithm to search product data 52 and receive, from the memory device 38B, search results data associated with the search request. The search results include a cobought subcategory for each of the plurality of products for purchase. The search engine unit 44 may transmit the list of search results to the recommender unit 48.

The recommender unit 48 identifies at least one product to recommend to the customer based on the search results. In one embodiment, the recommended item may be (1) associated with the identified shopping task, (2) among the plurality of cobought products from the initial search results, and (3) grouped in the one or more cobought subcategories. The recommender unit 48 transmits the recommended product to the communications unit 40.

The communications unit 40 sends information about the recommended product to the user computing device 12 via the communications network 14 to enable the user to purchase the recommended product.

Cobought Model Algorithm

As discussed above, purchase history data may be searched to count, for each pair of items (itemA, itemB), the cases they were bought together in the same orders. In one embodiment, products may have the following taxonomy:

(item, subcategory, category, department, superDept)

In other words, each product has a unique classification feature vector of size five as the above. For instance, a particular box of blueberries may have the following item taxonomy:

(blueberries—11 oz, blueberries, berries, fresh fruit, produce)

Usually at the subcategory level, a particular product can already be identified. For example, the product of blueberries in the above example is indicated by its subcategory. Items, within each subcategory, are essentially the same product but may have different packaging sizes, brands, flavors, etc.

In practice, a subcategory-level cobought model may be even more accurate and useful than an item-level cobought model. First, customers usually buy only one item from one subcategory, since items in the same subcategory typically serve the same purpose. Second, sparsity of data is a common problem in data mining; however, subcategory data is denser, making modeling results based on subcategory data more trustworthy.

An exemplary cobought model algorithm is shown below:

Algorithm 1 Basket Recommendation

```
1:  #Input: a list of items basket
2:  #Output: a list of items recommended
3:  #Step 1: analyze basket
4:  Get each basket item's cobought item list;
5:  Go through each item with its cobought items and build following
    dictionaries:
6:  for each item i in basket do
7:      basketSuperDeptDict[i.sdept][ "count"] += 1;
8:      basketSuperDeptDict[i.sdept][i.subcat] += 1;
9:      for each item c in i.coboughtItemList do
10:         Add c to list subcatListDict[c.subcat];
11:         Accumulate c.score if c was already in subcatListDict[c.subcat];
12:     end for
```

| Algorithm 1 Basket Recommendation |
| --- |
| 13: end for |
| 14: Sort subcats in each basketSuperDeptDict[sdept] by subcats' count descendingly; |
| 15: Sort items in each subcatListDict[subcat] by score descendingly; |
| 16: #Step 2: subcat cobought recommendations |
| 17: According to basket's sdept distribution gathered in step 1, proportionally get a certain number of recommendation items from each sdept in the following way: |
| 18: for each basket sdept do |
| 19:   for each basket subcat in sdept do |
| 20:     Get its subcat cobought list; |
| 21:     for each s in the subcat cobought list do |
| 22:       Test each item in subcatListDict[s]; |
| 23:       if the item's subcat is not already in basket or recommended then |
| 24:         Add it to recommended and break; |
| 25:       end if |
| 26:       if no feasible candidates found then |
| 27:         Backfill from a pre-built list of popular items in s and break; |
| 28:       end if |
| 29:     end for |
| 30:   end for |
| 31: end for |
| 32: #Step 3: Sort recommended |
| 33: Sort recommended by ranks and then by sdept so that the nth recommended items from each sdept are grouped together before all the (n + 1)th items for each n; |
| 34: Return recommended; |

This is a three-step algorithm. In step one, the basket (e.g., online shopping cart) is analyzed as a whole. Items from a same super-department (sdept) are grouped together. Items from each super-department typically serve one shopping task. By grouping them together, a customer's shopping tasks may be detected more easily. For each item, a list of all of its cobought items is generated. The cobought item score is a relevance score of this item to an anchor item, quantifying the likelihood that two items would be bought together. After the first step is complete, the basket's sdept distribution is generated from basket SuperDeptDict. For example, suppose a total of 10 items exist in the basket. After investigating their super departments, five are from super-department "produce", three from "pets" and two from "household & laundry". Of the three pet items, two are wet cat food and one is dry cat food. A cobought item dictionary subcatListDict would also be generated. In that dictionary, key is the subcategory and value is the list of cobought items, pointed from at least one item in the basket, in that subcategory. A same cobought item can be pointed from multiple anchor items in the basket. In that case, the cobought scores are summed up from all the anchor items as in line 11 of the algorithm. Finally, each list of cobought items is sorted by their accumulated scores in descending order.

In step 2, starting from the subcategory level, recommendations for each super-department are generated proportionally. Still using the above example, if the goal is to generate 6 recommendations proportionally, the number of items from the "pets" super-department is calculated as follows:

6 recommendations*(3 items from pets/10 items total)=2 recommended items from pets.

Wet cat food is the first anchor based on its subcategory count (which is 2, compared to 1 for dry cat food). In wet cat food's cobought subcategory list, dry cat food is the first subcategory. However, the customer already has dry cat food in her basket. As such, the second subcategory is considered, which is cat treats. The customer does not have any cat treats item in the basket. As a result, that subcategory is chosen. The first item from the subcategory is added to the recommended product list. If the list of subcatListDict ["cat treats"] is empty, an item is chosen from the subcategory's popular item list, which could be constructed independently for backfilling.

The above steps are repeated until all six recommendations are filled (two from pets, three from produce, and one from household & laundry, using the above formula).

Finally in step 3, the recommended products are sorted by ranks first and then by sdept. One reason for this sorting step is to ensure diversity of results, such that a variety of products are ultimately presented to the customer. In the above example, the final results will be:

1stItemFromProduce, 1stItemFromPets, 1stItemFromHouseholdAndLaundry, 2ndItemFromProduce, 2ndItemFromPets, 3rdItemFromProduce Cobought Model by MapReduce In one embodiment of the present invention, the item cobought and subcategory cobought models may be computed using MapReduce. The input to our cobought models is transaction data in the following format: (orderID, itemID). Once a customer places an order on N items, N entries will be stored into the database: (order1, item1), (order1, item2), . . . , (order1, item N). Therefore, for any pair of items, if both items have the same order ID, they were bought together in the same order. The transaction data is imported into the system and MapReduce is used to build the cobought models as shown below in Algorithm 2:

| Algorithm 2 Cobought model |
| --- |
| 1: #Input: a table D of (order, item); |
| 2: #Output: a table D11 of (item, coboughtItemList); |
| 3: D1 = SELF JOIN D ON order; |
| 4: D2 = D1 → (order, item1, item2); |
| 5: D3 = GROUP D2 BY (item1, item2); |
| 6: D4 = D3 → (item1, item2, cocount); |
| 7: D5 = FILTER D4 BY (item1 == item2); |
| 8: D6 = D5 → (item, count); |
| 9: D7 = JOIN D4 and D5 ON item1 and item2 respectively; |
| 10: D8 = D7 → (item1, item2, count1, count2, cocount); |
| 11: D9 = D8 → (item1, item2, coboughtScore) BY score-Func( ); |
| 12: D10 = GROUP D9 BY item1; |
| 13: D11 = D10 → (item1, coboughtItemList); |
| 14: STORE D11; |

In line 11 of the algorithm, different scoring methods scoreFunc( ) are used to compute a cobought score between item1, the anchor item, and item2, the cobought item. The following four methods may be used to calculate the cobought score:

Cocount $$coboughtScore = cocount$$

The number of co-occurrences of item1 and item2 equal the cobought score. For example, if item1 and item2 appeared in 900 same orders, the score between them is 900. This is a symmetric score, meaning item1's cobought score to item2 is equal to item2's cobought score to item1.

IDF $$coboughtScore = \frac{cocount}{popularity2}$$

The potential problem with the cocount method is that popular items are always at the top. For instance, bananas are in most grocery orders. Consequently, a large set of items would point to bananas as cobought items, and all these items may always have a high cocount with bananas. To solve this problem, the score may be discounted by popularity2, which is the number of occurrences of item2, the cobought item (bananas in this example). For instance, if item1 appeared in 1,000 orders, while item2 appeared in 10,000 orders, then score(item1→item2)=900/10000=0.09, and score(item2→item1)=900/1000=0.9. This is an asymmetric score.

Square $$coboughtScore = \frac{cocount^2}{popularity2}$$

In order to avoid discounting the cocount too much as in the IDF method, the cocount may be boosted by a square operation on the nominator, as shown above. This is an asymmetric score.

Jaccard $$coboughtScore = \frac{cocount}{popularity1 + popularity2 - cocount}$$

To make a symmetric score again, the cocount may be divided by popularities of both the anchor item and the cobought item. This is the Jaccard index, a statistic commonly used for measuring similarity between finite sample sets.

All the methods Cocount, IDF, Square, and Jaccard try to adjust rankings for cobought items in item cobought list of a particular anchor item so that the most relevant items are at the top. Once the cobought items are mixed as in step1 of Algorithm 1, the rankings may change again because each cobought item could accumulate scores and they may be compared across anchor items. At a high level, Algorithm 2 first ingests the transaction data and makes a self join. After that, it gets the cocount of each pair of items. If the pair of items have the same item ID, the cocount is actually the popularity for that item (line 7 and 8), which is the number of times it appeared in orders. At line 10, all the necessary features are ready: the popularity of the anchor item, the popularity of the cobought item, and their cocount. Finally, any of the above methods can be used to implement scoreFunc( ) and calculate the cobought score. Each of the operations can be MapReduced, making this model more scalable.

The subcategory level cobought model was computed in a similar way, substituting the itemID with its subcategory. Namely, before dumping the input (order, item) into the system, pre-processing step was added to convert each row into (order, subcat). The steps thereafter are almost identical to the item cobought model.

In order to make relevant recommendations, the subcategory cobought model is limited within each super-department. Unrelated items may be bought in the same order. For example, a customer may buy bananas with a can of wet cat food. However, bananas have few interactions with wet cat food. Cat food relates more to cat treats, cat bedding, cat toys and so on, which are usually in the same super-department (pets). By limiting the subcategory model within each super-department, the noise can be effectively filtered out. This logic is similar to that used to identify a customer's shopping tasks in step 1 of Algorithm 1, where basket items are grouped by each super-department and each group is considered respectively.

The subcategory popular item list for backfilling (line 27 of Algorithm 1) was computed by counting the number of orders on each item in a particular subcategory. The time window for the orders to be considered can be set to, for example, one month. In this situation, a bonus feature, "seasonality", is gained. Items are sorted by their "seasonal" popularities. For example, Halloween candies are most popular around October. If item popularities are computed based on annual sales data, Halloween candies may never be in the top position in its subcategory. However, if the time window is limited to the previous 30 days, Halloween candies would be experience a boost in the rankings around October. It may be more desirable, therefore, to backfill a particular candy subcategory with Halloween candies around Halloween (in October) instead of general candies (which may be preferable other months besides October).

The above-detailed algorithms confer a variety of benefits. They allow retailers to identify shopping tasks and better understand customers. It also allows retailers to remind customers about items they might otherwise forget to purchase. Finally, they allow customers to explore new products, starting with products most relevant to their current shopping task(s).

A fully automatic model may not always provide perfect results. Recommendations based on cobought models may occasionally introduce embarrassing items to some customers. For example, many families have both cats and dogs. As a result, cat food and dog food are frequently bought together. Therefore, the cobought model may recommend cat food based on a purchase of dog food, or vice versa. However, customers who have cats only may find it odd to be presented with a recommendation for dog food. To address this problem, filters may be implemented to guarantee mutual exclusions between certain subcategories, such as, for example, cat products and dog products, men's clothing and women's clothing, and so on.

Another issue that may occur in practice is that some items may already be identified by their categories, rather than subcategories. In that case, customers would typically only buy one item in those categories. As such, there would be no need to recommend additional items in those categories. Those categories could be filtered out in line 23 of Algorithm 1. Retailers may build a list of such categories for this purpose, or otherwise analyze the data at a category or subcategory level to determine what other tweaks to the algorithm might be needed. Such "semi-automatic tune-ups" will help improve the results yielded by the system. Additionally, if the taxonomy is not set up correctly, it is possible that several different types or sizes of the same good will be included in the same subcategory. For instance, all diapers would include all sizes of diapers, all baby food would include toddler food and infant food, etc., which could ultimately result in recommending the right product but the wrong size of specific type for a particular customer. Filters can also be utilized to address this issue.

Figure 3:
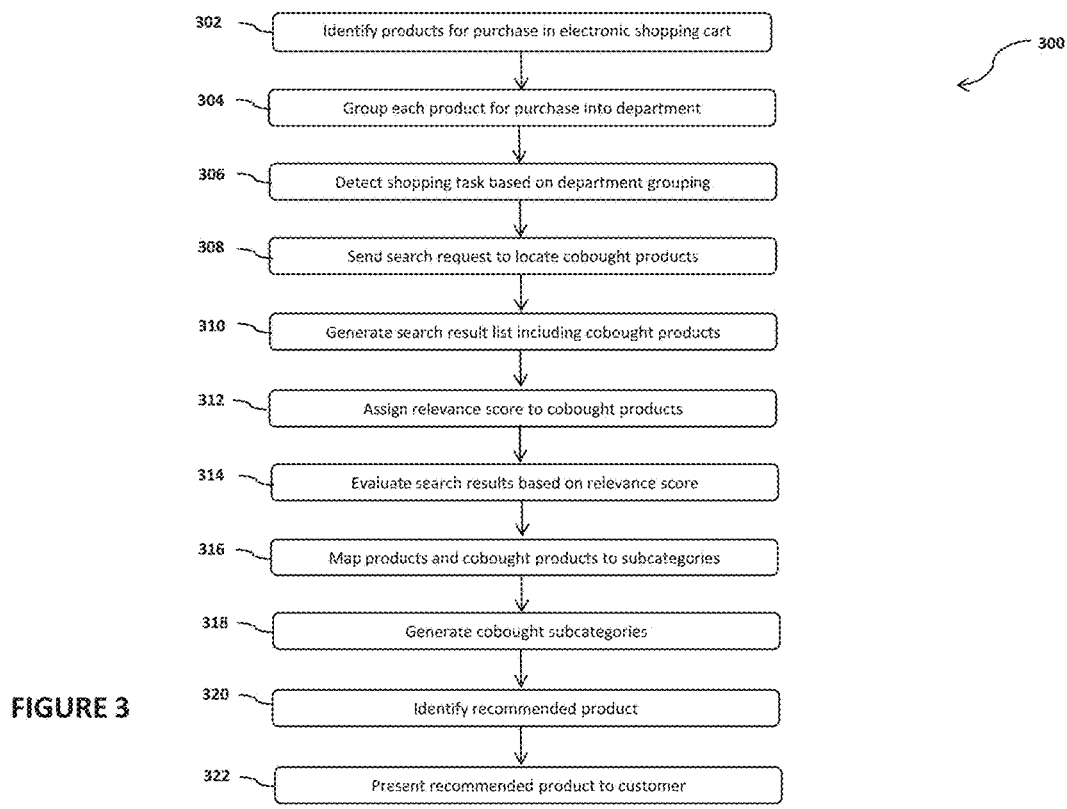
FIG. 3 is a flowchart of a method that may be used with the system shown in FIG. 1, according to a first embodiment of the present invention.

FIG. 3 is a flowchart of method 300 that may be used with the system 10 to allow a processing device to generate search engine results and provide personalized recommendations to a customer. The method includes a plurality of steps. Each method step may be performed independently of, or in combination with, other method steps. Portions of the method may be performed by any one of, or any combination of, the components of the system 10.

In a first step 302, an order unit identifies a plurality of products for purchase that a customer has placed in an electronic shopping cart of a retailer on a customer electronic device.

In a second step 304, the order unit groups each of the plurality of products for purchase into one or more departments.

In a third step 306, the order unit detects at least one shopping task associated with the customer based on the department grouping.

In a fourth step 308, the order unit sends to a search engine unit a search request to locate cobought products in a product database stored on a product server. The product database may contain historical data regarding past purchases of all products offered for sale by the retailer. A cobought product is defined as a product being associated with at least one past purchase including one of the plurality of products for purchase by the customer.

In a fifth step 310, the search engine unit generates a list of search results including a plurality of cobought products.

In a sixth step 312, the search engine unit assigns a relevance score to each of the plurality of cobought products.

In a seventh step 314, the search engine unit transmits the list of search results sorted by relevance score to a recommender unit.

In an eighth step 316, the recommender unit evaluates the list of search results and eliminates one or more results based on a predefined relevance score threshold.

In a ninth step 318, the recommender unit maps each of the plurality of products for purchase and each of the remaining cobought products from the list of search results into one or more subcategories.

In a tenth step 320, the recommender unit generates one or more cobought subcategories for each of the plurality of products for purchase.

In an eleventh step 322, the recommender unit identifies at least one recommended product, wherein the at least one recommended product is (1) associated with the identified shopping task, (2) among the plurality of cobought products, and (3) grouped in the one or more cobought subcategories.

In a twelfth step 324, the recommender unit presents the at least one recommended product to the customer on the customer electronic device.

It is contemplated that a dynamic feedback loop could be implemented such that when the customer chooses none of the recommended products, the system will generate one or more new recommended products for the customer to review before proceeding to checkout in the hopes that the customer finds and selects one or more recommended products. For instance, if a product or subcategory is presented to a particular customer N times and the customer does not purchase it, the product or subcategory may be filtered out and other products or subcategories would be presented to the customer instead.

Figure 4A:
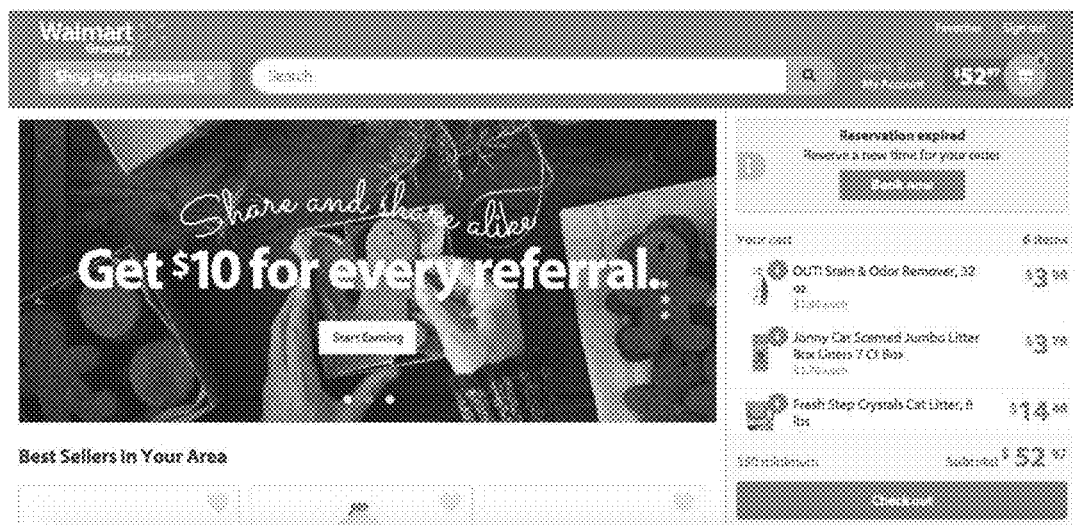
FIG. 4A-4B are illustrations of exemplary screenshots from the system of FIG. 1, according to a first embodiment of the present invention.
Figure 4B:
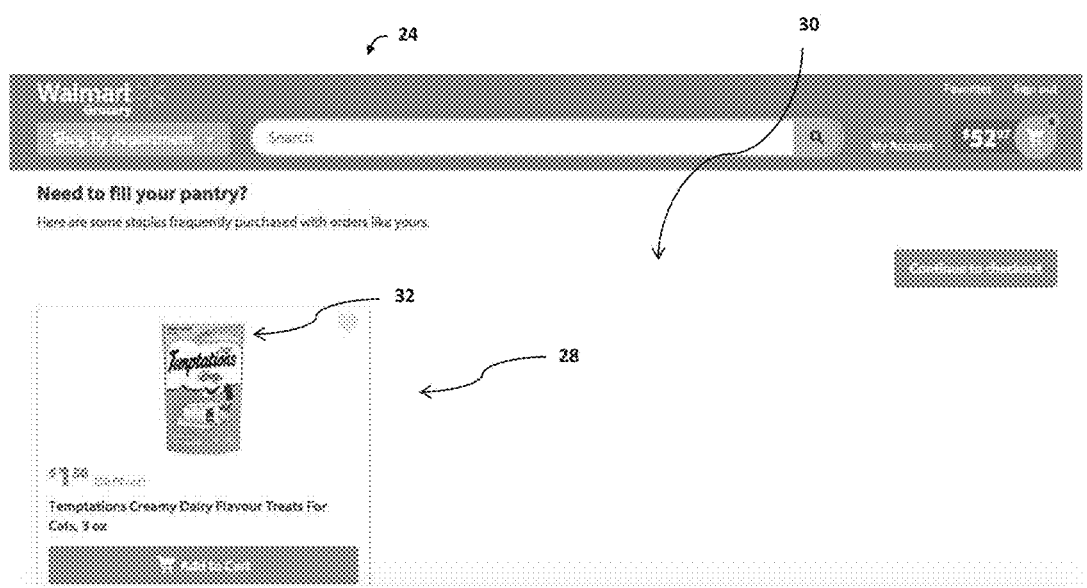

With reference to FIGS. 4A-4B, in one embodiment of the present invention, a store web page 24 associated with one or more websites of a retailer is displayed to the user. Referring now to FIG. 4A, an online shopping cart 26 is displayed in response to receiving a user request that allows a user to input one or more products that the user wishes to purchase. In the present example, multiple cat-related items have been added to shopping cart 26, such as an odor remover, cat litter, and cat litterbox liners.

Referring now to FIG. 4B, a recommended product list 28 is displayed on a recommendation webpage 30. The recommended product list 28 contains one or more recommended products 32 based on the filtered search engine results as described above. The user may add the one or more recommended products 32 to the online shopping cart 26, or proceed to checkout without adding additional products. As shown in the present example, the recommended product list 28 contains one recommended product 32, namely, cat treats. This item was chosen because this item is frequently purchased with other cat-related items such as cat litter, which was already placed in the user's online shopping cart 26.

Personalized Substitutions

Referring again to FIG. 1, the hosting server 16 may be configured to host a website or provide data to the app that is accessible by a user via one or more user computing devices 12. For example, the hosting server 16 may retrieve and store web page 24 (shown in FIGS. 7A-7C) associated with one or more websites in response to requests received by the user via the user computing device 12 to allow users to interact with the website and search and/or purchase products such as, for example, goods and/or services via the website. In one embodiment, the hosting server 16 is configured to generate and display web page 24 associated with the website in response to requests being received from consumers via corresponding web browsers that are displayed on the user computing devices 12. For example, in one embodiment, the hosting server 16 may display an online shopping cart 26 (shown in FIGS. 7A-7B) in response to receiving a user request that allows a user to input a product that the customer wishes to purchase. In addition, the hosting server 16 may transmit information about the product input to the search engine server 18 for use in generating search data in response to the system's search request. The hosting server 16 may also receive product substitution recommendations (shown in FIG. 7C) from the search engine server 18 that includes information associated with products that are selected based on the search criteria. The hosting server 16 may also display a recommendation webpage 30 to display the recommended product substitutions to the user and to allow the user to select one or more of the recommended products for purchase.

In the illustrated embodiment, the search engine server 18 is configured to receive a product search request from the hosting server 16 including one or more search terms, and generate search data including a plurality of products as a function of the search terms.

Figure 5:
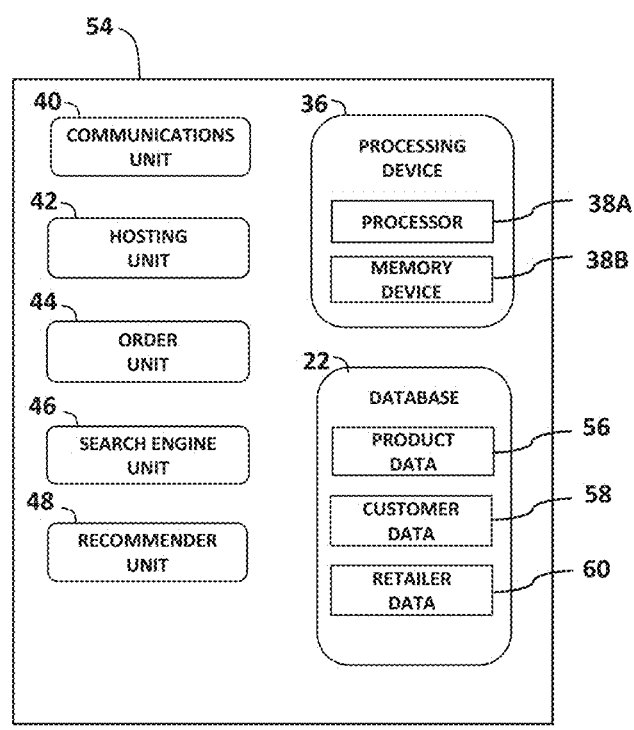
FIG. 5 is a schematic illustrating example components of a server, according to a second embodiment of the present invention.

Referring now to FIG. 5, according to a second embodiment of the present invention, the system 10 may include a system server 54 that is configured to perform the functions of the hosting server 16, the search engine server 18, and/or the database server 20. In the illustrated embodiment, the system server 54 includes a processing device 36 and the database 22.

The processing device 36 executes various programs, and thereby controls components of the system server 54 according to user instructions received from the user computing device 12. The processing device 36 may include a processor or processors 38A and a memory device 38B, e.g., read only memory (ROM) and random access memory (RAM), storing processor-executable instructions and one or more processors that execute the processor-executable instructions. In embodiments where the processing device 36 includes two or more processors 38A, the processors 38A can operate in a parallel or distributed manner. In an example, the processing device 36 may execute and/or implement a communications unit 40, a hosting unit 42, an order unit 44, a search engine unit 46, and a recommender unit 48.

The memory device 38B may be configured to store programs and information in the database 22, and retrieve information from the database 22 that is used by the processor to perform various functions described herein. The memory device 38B may include, but is not limited to, a hard disc drive, an optical disc drive, and/or a flash memory drive. Further, the memory device may be distributed and located at multiple locations.

In one embodiment of the present invention, the memory device 38B may include one or more of the memory devices and/or mass storage devices of one or more of the computing devices or servers. The modules that comprise the invention are composed of a combination of hardware and software, i.e., the hardware as modified by the applicable software applications. In one embodiment, the units of the present invention are comprised of one of more of the components of one or more of the computing devices or servers, as modified by one or more software applications.

The communications unit 40 retrieves various data and information from the database 22 and sends information to the user computing device 12 via the communications network 14 to enable the user to access and interact with the system 10. In one embodiment, the communications unit 40 displays various images on a graphical interface of the user computing device 12 preferably by using computer graphics and image data stored in the database 22 including, but not limited to, web pages, recommended product lists, and/or any suitable information and/or images that enable the system 10 to function as described herein.

The hosting unit 42 may be programmed to perform some or all of the functions of the hosting server 16 including hosting various web pages associated with one or more websites that are stored in the database 22 and that are accessible to the user via the user computing device 12. The hosting unit 42 may be programmed to generate and display web pages associated with a website in response to requests being received from users via corresponding web browsers.

The database 22 is configured to store product data 56, customer data 58, and retailer data 60.

The product data 56 may include data about a plurality of products such as semantic data, textual data, sales and global purchase history data, global acceptance and rejection data (i.e., for all customers of a retailer, whether customers accepted or rejected a specific substitute for an item), and global substitute data (i.e., for all customers of a retailer, when a customer is presented with an option to substitute an item, which item did the customer select?).

The customer data 58 may include customer account/profile information and customer personal preferences. Customer personal preferences may include data from past purchases by the customer and customer-specific acceptance and rejection data, including {item, substitute} pair data as well as order-level data. For example, if an item is accepted or rejected as a substitute when all of the items in the order have been accepted or rejected may be less significant than if there is partial acceptance or rejection by the customer (i.e., the customer specifically selected to accept or reject an item). Customer data 58 may additionally include whether a customer chose to substitute or remove an item from an order when she was presented with a substitute option and whether the customer reordered the original item or a substituted item in future ordered. Customer data 58 may also include loyalty data about a customer, such as whether and to what extent substitutions affect a customer's loyalty to or purchase frequency with a retailer. Customer data 58 may also include manually entered data (into the mobile application, for instance) including personal preferences, such as dietary or nutritional preferences, allergy information, etc.

The retailer data 60 may include data regarding how substitutions affect a retailer, such as financial implications and customer lifetime value data. Oftentimes, for a substitution to be acceptable to a customer, the substitution must be of equal or higher value, with the retailer absorbing the cost of higher-value substituted items. The retailer data 60 may also include customer loyalty data and profitability data. For example, a retailer may be willing to lose money in the short term in exchange for gaining loyal customers in the long-term.

In one embodiment of the present invention, the order unit 44 may identify a plurality of products included in an online order that a customer has submitted via user computing device 12. The customer's online order may include a preferred delivery method and a preferred delivery window (shown in FIGS. 7A-7B). The memory device 38B may retrieve information from the database 22 about the plurality of products. The order unit 44 may then recognize that one product of the plurality of products is not in stock for delivery within the specified delivery window and/or by the preferred delivery method. The order unit 44 may then send to the search engine unit 46 a search request to locate at least one substitute product.

The search engine unit 46 may be programmed to perform some or all of the functions of the search engine server 18 including generating and storing product data 56, customer data 58, and retailer data 60. The search engine unit 46 is coupled to the memory device 38B and the order unit 44. The search engine unit 46 is configured to receive the search request from the order unit 44. The search request may include one or more search terms and one or more filters, which may be based on product, customer, or retailer preferences, or some combination thereof.

The search engine unit 46 may search product data 56, customer data 58, and retailer data 60. The search engine unit 46 may employ an algorithm, such as the cobought model algorithm as disclosed herein or any other suitable algorithm, to query the database 22. The search engine unit 46 may receive, from the memory device 38B, search results data associated with the search request. The search results data may include a plurality of substitute product candidates. The search engine unit 46 may assign a weight to each of the plurality of substitute products based on one or more preferences associated with the retailer and/or preferences associated with the customer. The search engine unit 46 may transmit the list of search results to the recommender unit 48.

The recommender unit 48 is coupled to the processing device 38A and the memory device 38B and is configured to receive the search results. The recommender unit 48 evaluates the search results and may eliminate one or more of the results based on the customer's preferences. The recommender unit 48 may also rank and/or sort the search results based on the assigned weights. Alternatively, the search engine unit 46 may perform the ranking and/or sorting of the search results prior to transmitting the search results to the recommender unit 48.

The recommender unit 48 identifies at least one substitute product to recommend to the customer based on the search results. In addition to the products identified in the search results, it is contemplated that the recommender unit 48 may identify other substitute products based on characteristics associated with the products that may make them good candidates for substitution, such as a lower price (due to, for example, a promotion or coupon). Alternatively, the product may be healthier as compared to other options, or the product may be more popular overall with the retailer's customers, etc.

The recommender unit 48 may transmit the at least one substitute product to the communications unit 40 for presentation to the customer. The communications unit 40 may send information about the substitute product to the user computing device 12 via the communications network 14 to enable the user to accept or reject the substitute product.

The at least one substitute product may be presented to the customer at a number of different times, depending on when the retailer becomes aware that the customer's desired product is not available for delivery. This may occur when the customer places the online order, and/or at some point after the online order has been placed but before the preferred delivery window (e.g., the night before delivery is scheduled), and/or at the time of delivery. The at least one substitute product may be presented to the customer in any suitable manner, including via the website during online ordering, or via email, text message, phone call, mobile application or push notification, or in person.

Figure 6:
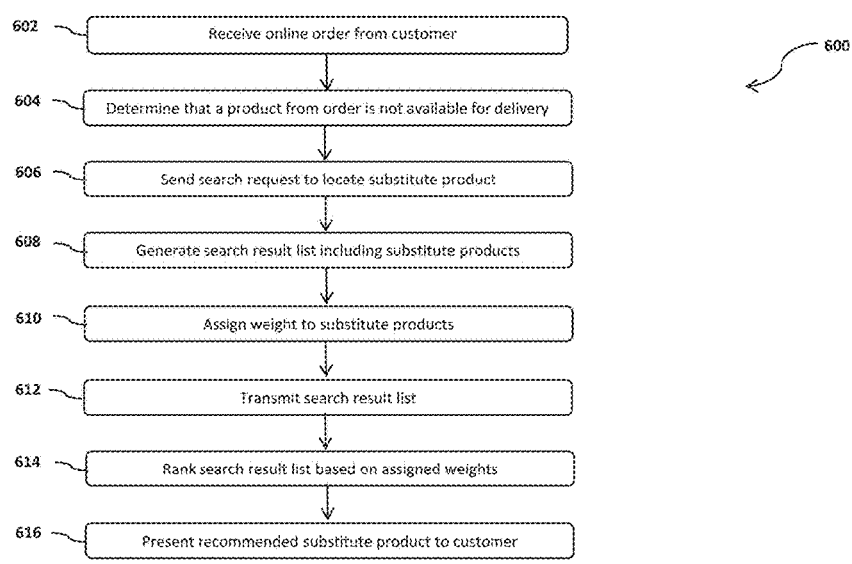
FIG. 6 is a flowchart of a method that may be used with the system shown in FIG. 5, according to a second embodiment of the present invention.

FIG. 6 is a flowchart of method 600 that may be used with the system 10 to allow a processing device to generate search engine results and provide personalized substitute recommendations to a customer. The method includes a plurality of steps. Each method step may be performed independently of, or in combination with, other method steps. Portions of the method may be performed by any one of, or any combination of, the components of the system 10 according to FIG. 5.

In a first step 602, an order unit receives an online order from a customer via a customer device, wherein the online order comprises a plurality of products.

In a second step 604, the order unit determines that at least one product of the plurality of products is not available for delivery.

In a third step 606, the order unit sends to a search engine unit a search request to locate at least one substitute product in a database stored on a server.

In a fourth step 608, the search engine unit generates a list of search results including a plurality of substitute products. The plurality of substitute products may be selected based on at least one of: (1) product data associated with the at least one product that is not available for delivery, (2) customer data comprising at least one personal preference of the customer, and (3) retailer data associated with the retailer.

In a fifth step 610, the search engine unit assigns a weight to each of the plurality of substitute products based on at least one substitute preference associated with the retailer and at least one substitute preference associated with the customer.

In a sixth step 612, the search engine unit transmits the list of search results to a recommender unit.

In a seventh step 614, the recommender unit ranks the list of search results based on the assigned weights.

In an eighth step 616, the recommender unit presents one or more substitute products of the list of search results to the customer on the customer device based on the ranking.

Figure 7A:
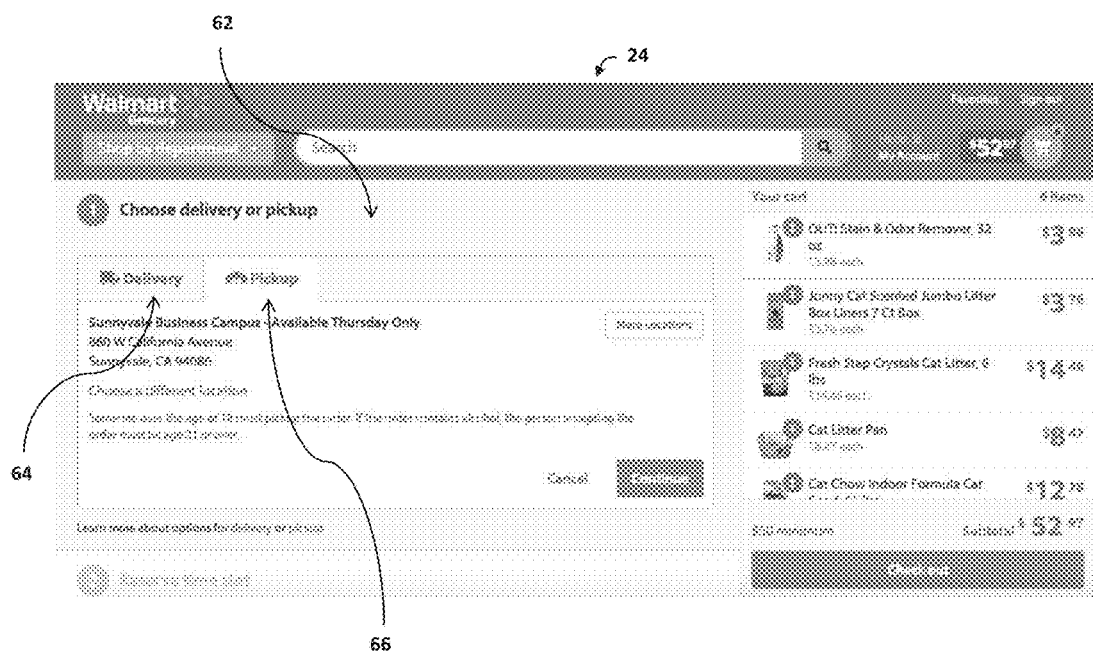
FIGS. 7A-7C are illustrations of exemplary screenshots from the system of FIG. 5, according to a second embodiment of the present invention.
Figure 7B:
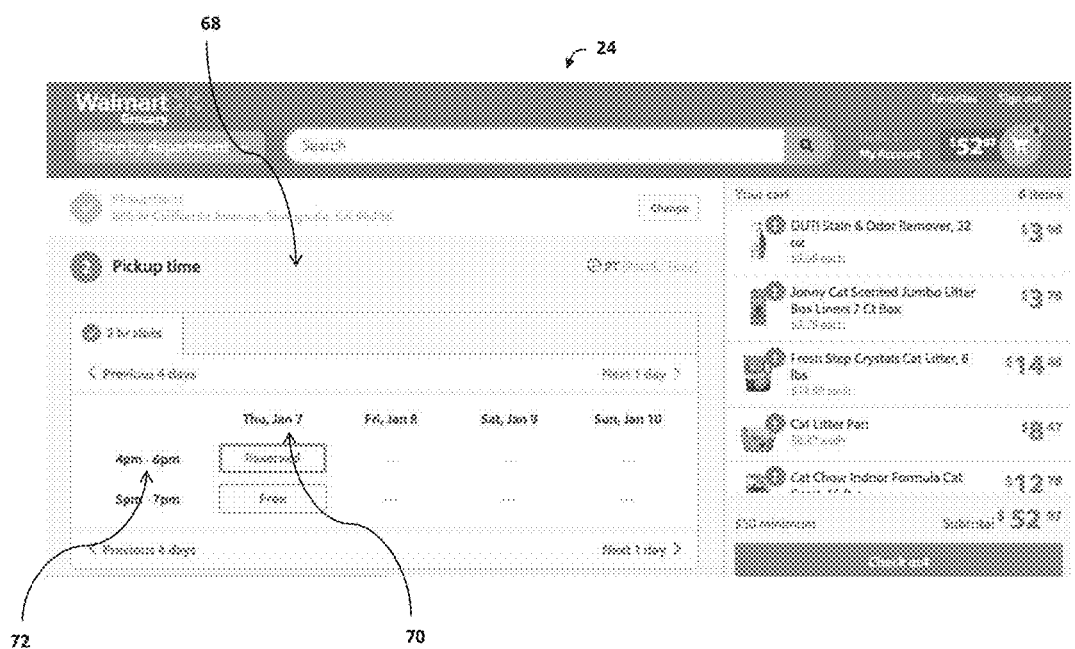
Figure 7C:
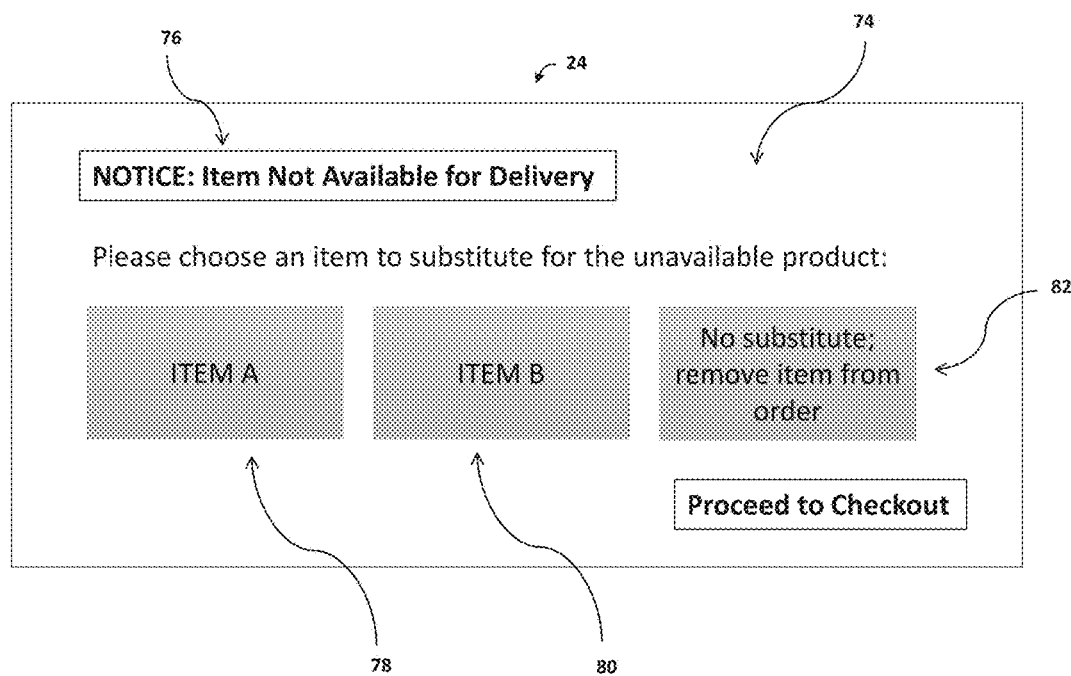

With reference to FIGS. 7A-7C, in a second embodiment of the present invention, a store web page 24 associated with one or more websites of a retailer is displayed to the user. Referring now to FIG. 7A, a delivery method page 62 is displayed. Delivery method options may include, for example, home delivery 64 or in-store pickup 66. If the user chooses home delivery 64, the user may enter a home address (not shown) to which the order will be delivered. If the user chooses in-store pickup 66, the user may be prompted to choose a store location, if multiple locations are available.

Referring now to FIG. 7B, a delivery window page 68 is displayed. A preferred delivery window may include a date 70 (or date range) and/or a specific time slot 72.

Referring now to FIG. 7C, a substitution notice page 74 is displayed. The substitution notice 76 informs the user that a product in the user's order is not available for delivery. The user may be presented with a variety of substitution options. A first product substitution option 78 and a second product substitution option 80 may each present a product similar to the unavailable product but may differ in some key aspect, such as brand, price, or size. If neither substitute product 78 or 80 is acceptable to the user, the user may choose a "No Substitute" option 82, which will remove the unavailable product from the user's order and no replacement product will be added. It is contemplated that a dynamic feedback loop could be implemented such that when the user chooses none of the available substitutes, the system will generate one or more new recommended substitutes for the user to review before proceeding to checkout in the hopes that the user finds and selects a suitable substitute product.

In one embodiment of the present invention, an employee of a retailer (e.g., a picker or a personal shopper) that is responsible for fulfilling an order on behalf of a customer may make the substitution decisions rather than the customer. It is contemplated that the same substitution information presented to the customer as outlined above would be presented to the employee when a substitution is necessary or desirable, for instance, when the employee is picking products from a retail store on behalf of a customer and one of the products is out of stock. The employee may accept or reject substitution recommendations on behalf of the customer, such as when the customer is not reachable or is not responding to requests for instructions.

Recipe Matching

Referring again to FIG. 1, the hosting server 16 may be configured to host a website or provide data to the app that is accessible by a user via one or more user computing devices 12. For example, the hosting server 16 may retrieve and store web page 24 (shown in FIGS. 10A-10D) associated with one or more websites in response to requests received by the user via the user computing device 12 to allow users to interact with the website and search and/or purchase products such as, for example, goods and/or services via the website. In one embodiment, the hosting server 16 is configured to generate and display web page 24 associated with the website in response to requests being received from consumers via corresponding web browsers that are displayed on the user computing devices 12. For example, in one embodiment, the hosting server 16 may display a recipe 84 (shown in FIGS. 10A-10B). In addition, the hosting server 16 may transmit information about the ingredient list 86 to the search engine server 18 for use in generating search data in response to the system's search request. The hosting server 16 may also receive a recommended product list 88 (shown in FIG. 10D) from the search engine server 18 that includes information associated with products that are selected based on the search criteria. The hosting server 16 may display the recommended product list 88 containing one or more recommended products 90 to the user and to allow the user to select one or more of the recommended products 90 for purchase.

In the illustrated embodiment, the search engine server 18 is configured to receive a product search request from the hosting server 16 including one or more search terms, and generate search data including a plurality of products as a function of the search terms. For example, in one embodiment, the search engine server 18 may initiate a search to locate products matching ingredients in a recipe or grocery list from data contained in the database 22.

Figure 8:
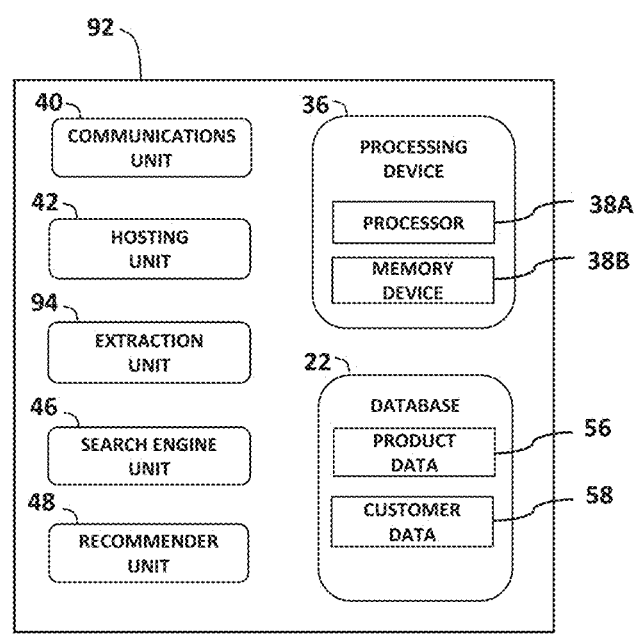
FIG. 8 is a schematic illustrating example components of a server, according to a third embodiment of the present invention.

Referring now to FIG. 8, in a third embodiment of the present invention, the system 10 may include a system server 92 that is configured to perform the functions of the hosting server 16, the search engine server 18, and/or the database server 20. In the illustrated embodiment, the system server 92 includes a processing device 36 and the database 22.

The processing device 36 executes various programs, and thereby controls components of the system server 92 according to user instructions received from the user computing device 12. The processing device 36 may include a processor or processors 38A and a memory device 38B, e.g., read only memory (ROM) and random access memory (RAM), storing processor-executable instructions and one or more processors that execute the processor-executable instructions. In embodiments where the processing device 36 includes two or more processors 38A, the processors 38A can operate in a parallel or distributed manner. In an example, the processing device 36 may execute and/or implement a communications unit 40, a hosting unit 42, an extraction unit 94, a search engine unit 46, and a recommender unit 48.

The memory device 38B may be configured to store programs and information in the database 22, and retrieve information from the database 22 that is used by the processor to perform various functions described herein. The memory device 38B may include, but is not limited to, a hard disc drive, an optical disc drive, and/or a flash memory drive. Further, the memory device may be distributed and located at multiple locations.

In one embodiment of the present invention, the memory device 38B may include one or more of the memory devices and/or mass storage devices of one or more of the computing devices or servers. The modules that comprise the invention are composed of a combination of hardware and software, i.e., the hardware as modified by the applicable software applications. In one embodiment, the units of the present invention are comprised of one of more of the components of one or more of the computing devices or servers, as modified by one or more software applications.

The communications unit 40 retrieves various data and information from the database 22 and sends information to the user computing device 12 via the communications network 14 to enable the user to access and interact with the system 10. In one embodiment, the communications unit 40 displays various images on a graphical interface of the user computing device 12 preferably by using computer graphics and image data stored in the database 22 including, but not limited to, web pages, recommended product lists, and/or any suitable information and/or images that enable the system 10 to function as described herein.

The hosting unit 42 may be programmed to perform some or all of the functions of the hosting server 16 including hosting various web pages associated with one or more websites that are stored in the database 22 and that are accessible to the user via the user computing device 12. The hosting unit 42 may be programmed to generate and display web pages associated with a website in response to requests being received from users via corresponding web browsers.

The database 22 is configured to store web product data associated with a plurality of products and customer data associated with a plurality of customers. The product data may include product name(s), product type, product price, nutritional/dietary information, and purchase history data. The customer data may include a customer's personal purchase history data, personal preferences, and dietary restrictions.

In one embodiment of the present invention, the extraction unit 94 may identify and extract a list of ingredients from a recipe or grocery list on a webpage visited by a customer via user computing device 12. In one embodiment, the retailer's system is integrated with a third party recipe website. In an alternate embodiment, the retailer's system is not integrated with the recipe website, so the customer can download a browser extension that automatically detects a recipe or grocery list on a web page. The extraction unit 94 may then send to the search engine unit 46 a search request to locate products matching the ingredients from data contained in the database 22.

The search engine unit 46 may be programmed to perform some or all of the functions of the search engine server 18 including generating and storing product data 56 and customer data 58. The search engine unit 46 is coupled to the memory device 38B and the extraction unit 94. The search engine unit 46 is configured to receive the search request from the extraction unit 94. The search engine unit 46 may search product data 56 and customer data 58 and receive, from the memory device 38B, search results data associated with the search request. The (initial) search results data includes the plurality of matching products. The search engine unit 46 may transmit the list of search results to the recommender unit 48.

The recommender unit 48 is coupled to the processing device 38A and the memory device 38B and is configured to receive the search results. The recommender unit 48 identifies at least one product to recommend to the customer based on the search results. The recommender unit 48 transmits the recommended product to the communications unit 40.

The communications unit 40 sends information about the recommended product to the user computing device 12 via the communications network 14 to enable the user to purchase the recommended product.

Figure 9:
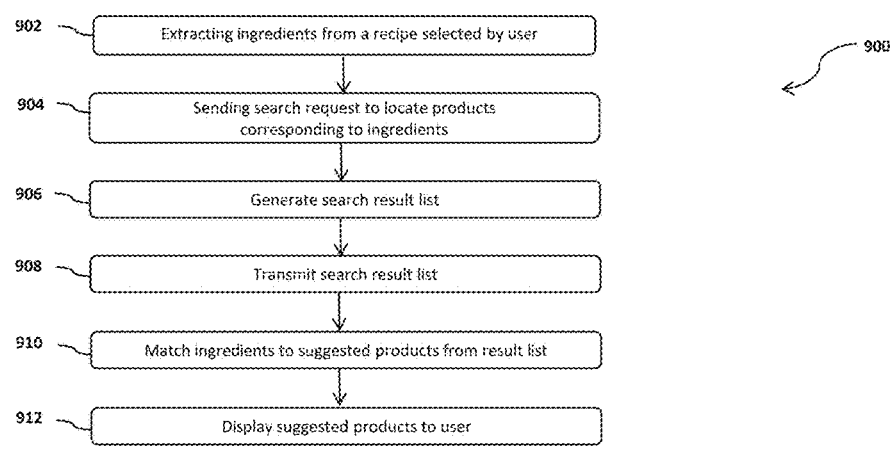
FIG. 9 is a flowchart of a method that may be used with the system shown in FIG. 8, according to a third embodiment of the present invention.

FIG. 9 is a flowchart of method 900 that may be used with the system 10 to allow a processing device to generate search engine results, match ingredients to a retailer's products, and provide personalized recommendations to a customer. The method includes a plurality of steps. Each method step may be performed independently of, or in combination with, other method steps. Portions of the method may be performed by any one of, or any combination of, the components of the system 10.

In a first step 902, an extraction unit extracts one or more ingredients from an electronically displayed recipe selected by a user on a user device.

In a second step 904, the extraction unit sends to a search engine unit a search request to locate products corresponding to the ingredients from data contained in a database stored on a server.

In a third step 906, the search engine unit generates a list of search results including products corresponding to the ingredients. The list of search results is generated based on characteristics corresponding to each of the ingredients. The characteristics may include, for instance, a name, a quantity, a product type, and a personal preference associated with the user.

In a fourth step 908, the search engine unit transmits the list of search results to a recommender unit.

In a fifth step 910, the recommender unit matches each of the ingredients with one or more suggested products chosen from the list of search results. The selection of a suggested product may be based on at least one user preference, such as a price preference and/or a health preference.

In a sixth step 912, the suggested product is displayed to the user on the user device.

With reference to FIGS. 10A-10D, in a first embodiment of the present invention, a store web page 24 associated with one or more websites of a retailer is displayed to the customer.

Figure 10A:
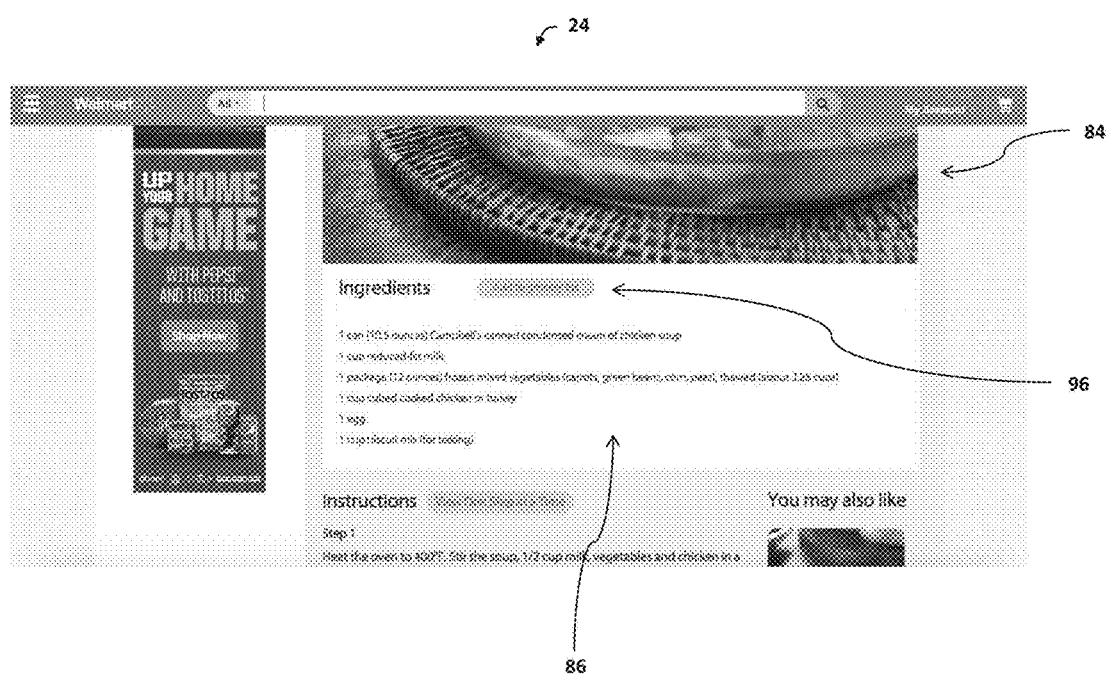
FIGS. 10A-10D are illustrations of exemplary screenshots from the system of FIG. 8, according to an embodiment of the present invention.
Figure 10B:
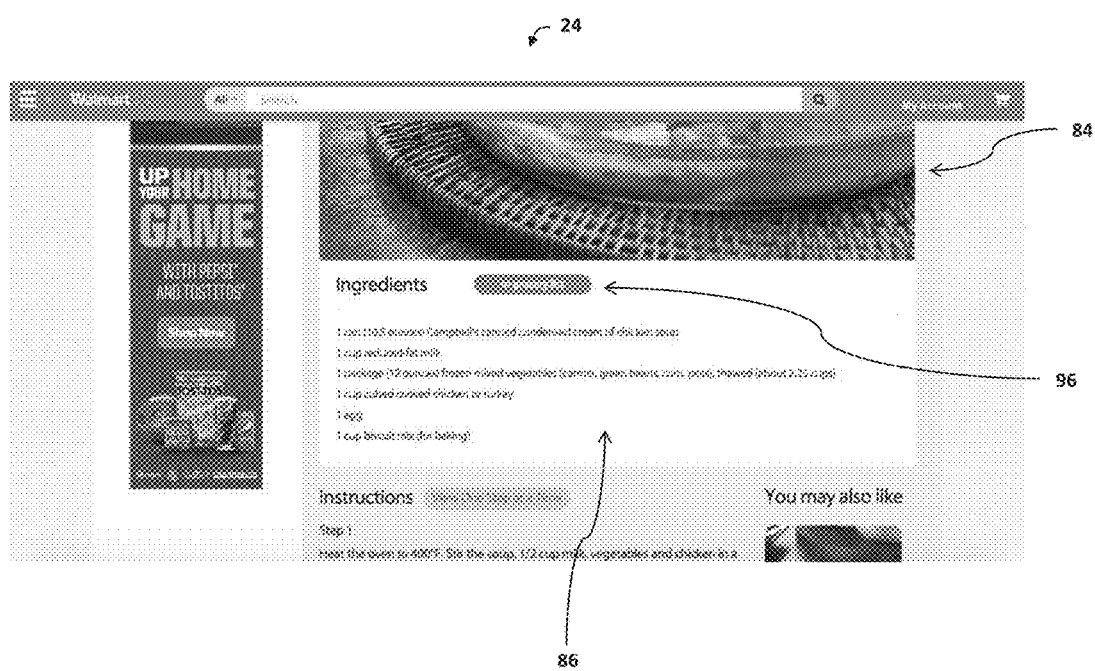

Referring now to FIG. 10A, a recipe 84 with an ingredient list 86 is displayed on web page 24. In one embodiment, the system of FIG. 8 may automatically detect the ingredient list 86 and begin extraction. In an alternate embodiment, as shown in FIG. 10A, the user may manually add the ingredient list 86 to a grocery list (shown in FIG. 10D) using an "Add to Grocery List" button 96 or the like. Referring now to FIG. 10B, the web page 24 is shown after the user has manually added the ingredient list 86 using the button 96.

Figure 10C:
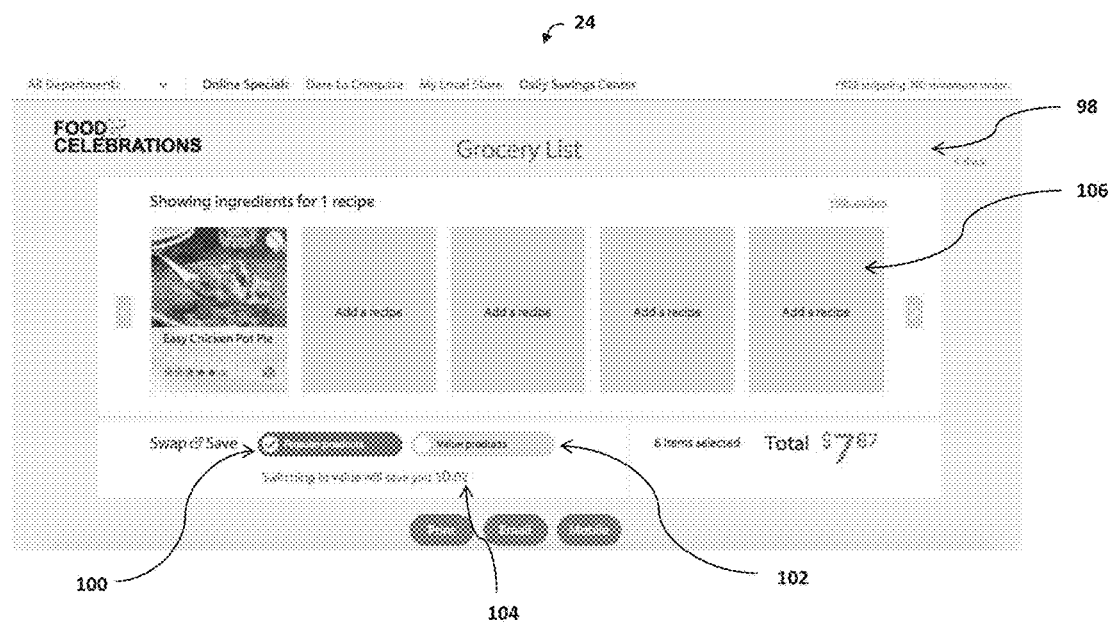

Referring now to FIG. 10C, a grocery list 98 is displayed on a web page 24. An optional feature including additional filters may be displayed with grocery list 98. A default filter, shown here as "Popular Products" filter 100, may be applied. Choosing the "Popular Products" filter 100 may allow suggestion of products that are chosen most often by users. The user may instead choose an alternate filter, shown here as "Value Products" filter 102. Choosing "Value Products" filter 102 may allow suggestion of products that will be least expensive to the user. The web page 24 may also display a value 104 that represents a total amount that may be saved if the user switches from the "Popular Products" filter 100 to the "Value Products" filter 102.

Grocery list 98 may also include an "Add a Recipe" option 106, which may allow the user to add the ingredients from one or more additional recipes to the grocery list. If there are ingredients that overlap between one or more recipes, the total amount of the ingredient needed may be reflected in the grocery list 98. For example, if a first recipe calls for two pounds of chicken and a second recipe calls for one pound of chicken, a total of three pounds of chicken will be reflected in the grocery list 98. Using the "Add a Recipe" option 106, the user may add another recipe from the retailer's website or, in some systems, a recipe from a third party recipe website.

Figure 10D:
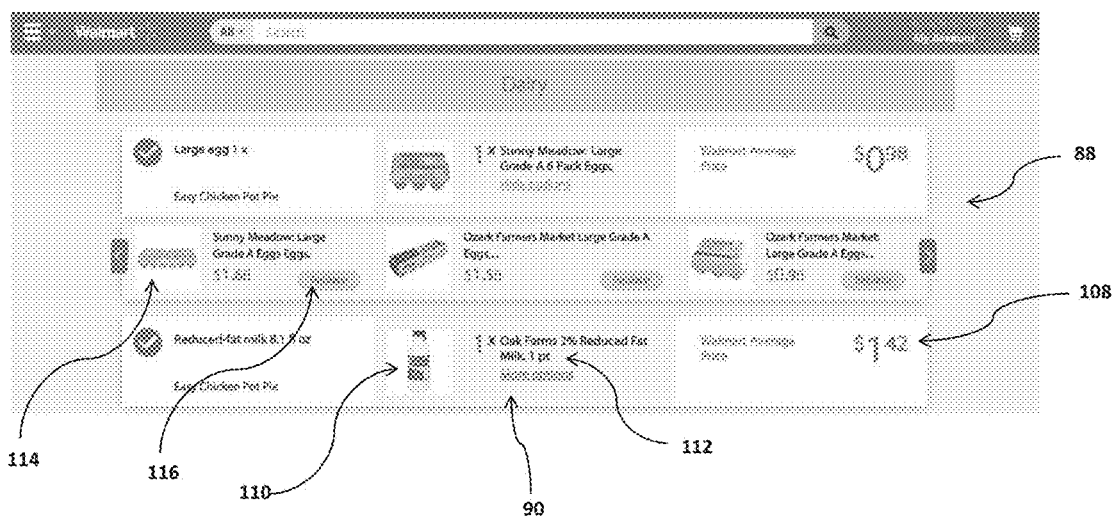

Referring now to FIG. 10D, a recommended product list 88 is displayed on web page 24. The recommended product list 88 contains one or more recommended products 90. Various information about the one or more recommended products 90 may also be displayed, such as average price 108, product image 110, and textual information 112 (e.g., brand, type, quantity, etc.).

The user may select the one or more recommended products 90 from the recommended product list 88. Alternatively, the user may view one or more alternative products 114. The one or more alternative products 114 may differ from the recommended product 90 by price, brand, type, or other characteristic. The user may replace the one or more recommended products 90 with the one or more alternative products 114 by selecting a "Replace" button 116 or similar.

Additionally, it is contemplated that the system of the present invention may provide recommended substitutes in the event that a product matching a particular ingredient is not available or a better option for a particular customer may be available, using the product substitution system and method described herein.

The system may also display to the customer suggestions for general merchandise items, such as cooking equipment needed for the recipe, and/or other complementary recipes that utilize some or all of the recommended products.

A controller, computing device, server or computer, such as described herein, includes at least one or more processors or processing units and a system memory (see above). The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

What is claimed is:

1. A system comprising:
a product database stored on a server;
a user interface on a user device accessible to a user and including an online shopping cart, wherein the user requests to add a plurality of products to the online shopping cart; and
a processing device of the server, wherein the processing device is in communication with the user interface, the processing device including:
an order unit configured to identify the plurality of products and retrieve information from the product database about the plurality of products, group each of the plurality of products into one or more departments and detect at least one shopping task associated with the user based on the grouping, and transmit a search request to a search engine unit,
the search engine unit configured to:
receive the search request, the search request including a request to locate at least one cobought product, a cobought product being a product that is associated with at least one past purchase including one of the plurality of products, initiate a search on the product database, receive a list of search results including a plurality of cobought products, generate a relevance score associated with each of the plurality of cobought products, and transmit the list of search results sorted by relevance score to a recommender unit; and
the recommender unit configured to:
evaluate the list of search results and eliminate one or more results based on a predefined relevance score threshold, map the each of the plurality of products for purchase and each remaining cobought product from the list of search results into one or more subcategories, generate one or more cobought subcategories for the each of the plurality of products for purchase, identify at least one recommended product based on the list of search results, and present, to the user on the user device, the at least one recommended product.

2. The system of claim 1, wherein the at least one recommended product is associated with an identified shopping task.

3. The system of claim 1, wherein the at least one recommended product is among the plurality of cobought products.

4. The system of claim 1, wherein the at least one recommended product is grouped in the one or more cobought subcategories.

5. The system of claim 1, wherein the at least one recommended product is:
associated with an identified shopping task,
among the plurality of cobought products, and
grouped in one or more cobought categories.

6. The system of claim 1, wherein the product database contains historical data regarding past purchases of all products offered for sale by a retailer, wherein the past purchases include all purchases made by all users.

7. The system of claim 1, wherein the product database is searched using a cobought model algorithm.

8. The system of claim 1, wherein the cobought product is associated with the at least one past purchase of any user having made a purchase with a retailer.

9. A computer-implemented method comprising:
identifying, by an order unit, a plurality of products for purchase that a customer has placed in an electronic shopping cart of a retailer on a customer electronic device;
grouping, by the order unit, each of the plurality of products for purchase into one or more departments;
detecting, by the order unit, at least one shopping task associated with the customer based on the department grouping;
sending, by the order unit to a search engine unit, a search request to locate in a product database stored on a product server, a product, at least one cobought product, a cobought product being associated with at least one past purchase including one of the plurality of products for purchase;
generating, by the search engine unit, a list of search results including a plurality of cobought products;
assigning, by the search engine unit, a relevance score to each of the plurality of cobought products;
transmitting, by the search engine unit to a recommender unit, the list of search results sorted by relevance score;
evaluating, by the recommender unit, the list of search results and eliminating one or more results based on a predefined relevance score threshold;
mapping, by the recommender unit, the each of the plurality of products for purchase and each remaining cobought product from the list of search results into one or more subcategories;
generating, by the recommender unit, one or more cobought subcategories for the each of the plurality of products for purchase;
identifying, by the recommender unit, at least one recommended product;
presenting, by the recommender unit to the customer on the customer electronic device, the at least one recommended product.

10. The method of claim 9, wherein the at least one recommended product is associated with an identified shopping task.

11. The method of claim 9, wherein the at least one recommended product is among the plurality of cobought products.

12. The method of claim 9, wherein the at least one recommended product is grouped in the one or more cobought subcategories.

13. The method of claim 9, wherein the at least one recommended product is:
associated with an identified shopping task,
among the plurality of cobought products, and
grouped in one or more cobought categories.

14. The method of claim 9, wherein the product database contains historical data regarding past purchases of all products offered for sale by the retailer, wherein the past purchases include all purchases made by all users.

15. The method of claim 9, wherein the product database is searched using a cobought model algorithm.

16. The method of claim 9, wherein the cobought product is associated with the at least one past purchase of any user having made a purchase with the retailer.

17. A non-transitory information recording medium on which a computer readable program is recorded that causes a computer to function as a system comprising:
a product database stored on a server;

a user interface on a user device accessible to a user and including an online shopping cart, wherein the user requests to add a plurality of products to the online shopping cart; and a processing device of the server, wherein the processing device is in communication with the user interface, the processing device including:

an order unit configured to identify the plurality of products and retrieve information from the product database about the plurality of products, group each of the plurality of products into one or more departments and detect at least one shopping task associated with the user based on the grouping, and transmit a search request to a search engine unit, the search engine unit configured to:
receive the search request, the search request including a request to locate at least one cobought product, a cobought product being a product that is associated with at least one past purchase including one of the plurality of products, initiate a search on the product database, receive a list of search results including a plurality of cobought products, generate a relevance score associated with each of the plurality of cobought products, and transmit the list of search results sorted by relevance score to a recommender unit; and the recommender unit configured to:
evaluate the list of search results and eliminate one or more results based on a predefined relevance score threshold, map the each of the plurality of products for purchase and each remaining cobought product from the list of search results into one or more subcategories, generate one or more cobought subcategories for the each of the plurality of products for purchase, identify at least one recommended product, and present, to the user on the user device, the at least one recommended product.

18. The non-transitory information recording medium of claim 17, wherein the at least one recommended product is associated with an identified shopping task.

19. The non-transitory information recording medium of claim 17, wherein the at least one recommended product is among the plurality of cobought products.

20. The non-transitory information recording medium of claim 17, wherein the at least one recommended product is grouped in the one or more cobought subcategories.

21. The non-transitory information recording medium of claim 17, wherein the at least one recommended product is:
associated with an identified shopping task,
among the plurality of cobought products, and
grouped in one or more cobought categories.

22. The non-transitory information recording medium of claim 17, wherein the product database contains historical data regarding past purchases of all products offered for sale by a retailer, wherein the past purchases include all purchases made by all users.

23. The non-transitory information recording medium of claim 17, wherein the product database is searched using a cobought model algorithm.

24. The non-transitory information recording medium of claim 17, wherein the cobought product is associated with the at least one past purchase of any user having made a purchase with a retailer.

* * * * *